(12) United States Patent
Hermans

(10) Patent No.: US 8,932,189 B2
(45) Date of Patent: Jan. 13, 2015

(54) TRAINING TOOL, COUPLING PIECE AND METHOD FOR HANDLING A TRAINING TOOL

(75) Inventor: Johannes Theodorus Hermans, Bergschenhoek (NL)

(73) Assignee: Tube Trainer B.V., Delft (NL)

(*) Notice: Subject to any disclaimer, the term of this patent is extended or adjusted under 35 U.S.C. 154(b) by 808 days.

(21) Appl. No.: 11/262,457

(22) Filed: Oct. 28, 2005

(65) Prior Publication Data

US 2006/0079383 A1 Apr. 13, 2006

Related U.S. Application Data

(63) Continuation-in-part of application No. PCT/NL2004/000279, filed on Apr. 24, 2004.

(30) Foreign Application Priority Data

Apr. 28, 2003 (NL) ...................................... 1023281

(51) Int. Cl.
*A63B 21/22* (2006.01)
*A63B 21/06* (2006.01)
*A63B 21/072* (2006.01)
*F16B 7/04* (2006.01)
*A63B 71/06* (2006.01)

(52) U.S. Cl.
CPC ............ *A63B 21/0603* (2013.01); *A63B 21/072* (2013.01); *F16B 7/0433* (2013.01); *A63B 2071/0625* (2013.01)
USPC ........................................................ 482/110

(58) Field of Classification Search
CPC .... A63B 15/00; A63B 15/05; A63B 21/0004; A63B 21/06; A63B 21/0601; A63B 21/0603; A63B 21/072; A63B 21/076; A63B 2021/072
USPC ................................ 482/108–110, 44, 74, 131
See application file for complete search history.

(56) References Cited

U.S. PATENT DOCUMENTS

| | | | | |
|---|---|---|---|---|
| 2,364,581 A * | 12/1944 | Zadek | ........................... | 446/419 |
| 2,380,368 A * | 7/1945 | Desmond | ...................... | 446/419 |
| 2,492,922 A * | 12/1949 | McLain | ........................ | 434/403 |
| 2,509,810 A * | 5/1950 | Core, Jr | ........................ | 482/108 |
| 3,163,421 A * | 12/1964 | Matyko | ......................... | 473/594 |
| 3,843,117 A * | 10/1974 | Johnson | ........................ | 482/110 |
| 4,218,057 A * | 8/1980 | Wilson | ............................. | 482/93 |
| 4,278,248 A | 7/1981 | Kifferstein | | |
| 4,664,373 A * | 5/1987 | Hait | ................................ | 482/93 |
| 4,743,016 A * | 5/1988 | Van Derworp et al. | ......... | 482/93 |
| 4,773,640 A * | 9/1988 | Kolbel et al. | ................. | 482/108 |
| 4,964,630 A * | 10/1990 | Curtiss | ............................ | 482/50 |
| 4,986,535 A * | 1/1991 | Hull et al. | ....................... | 482/93 |
| 5,044,250 A * | 9/1991 | Beyer | ............................ | 84/422.4 |
| 5,056,778 A | 10/1991 | Hull et al. | | |
| 5,659,143 A * | 8/1997 | Isackson | ........................ | 84/402 |
| 5,667,466 A * | 9/1997 | Riley, Jr. | ....................... | 482/105 |

(Continued)

FOREIGN PATENT DOCUMENTS

DE 3609363 A1 11/1987

*Primary Examiner* — Oren Ginsberg
(74) *Attorney, Agent, or Firm* — Swanson & Bratschun, L.L.C.

(57) ABSTRACT

A training tool comprising an elongate hollow space enclosed by a holder, which hollow space is partly filled with an amount of freely movable particles, the particles being configured to provide a reactive impact when the particles collide during acceleration and deceleration.

19 Claims, 12 Drawing Sheets

(56) References Cited

U.S. PATENT DOCUMENTS

| | | |
|---|---|---|
| 5,857,946 A | 1/1999 | Brown |
| 6,228,002 B1 | 5/2001 | Dantolan |
| 6,280,364 B1 * | 8/2001 | Deac et al. ............... 482/106 |
| 6,555,736 B1 * | 4/2003 | Delosreyes ............... 84/402 |
| 6,981,933 B2 * | 1/2006 | Scafidel ............... 482/110 |
| 2010/0022361 A1 * | 1/2010 | Raines et al. ............... 482/93 |

* cited by examiner

TRAINING TOOL, COUPLING PIECE AND METHOD FOR HANDLING A TRAINING TOOL

RELATED APPLICATIONS

This application is a continuation in part of International Application Number PCT/NL2004/000279, filed Apr. 24, 2004 (WO 2004/096377, published Nov. 11, 2004) entitled "Training Tool, Coupling Piece and Method for Handling a Training Tool," which claims priority to Netherlands Application No. 1023281, filed Apr. 28, 2003, both of which are hereby incorporated by reference.

TECHNICAL FIELD

The invention relates to a training tool, and more particularly to a training tool comprising a hollow space enclosed by a holder, which space is partly filled with an amount of freely movable particles of solid material.

BACKGROUND OF THE INVENTION

Training tools including a hollow space filled with freely movable particles of solid material are known in the art. Such a training tool is known, for instance, from DE 36 09 363, in which a dumbbell is described with is provided with a ball-shaped hollow space. In one of the embodiments, this hollow space is partly filled with granular material, so that the total weight of the dumbbell and the position of the imaginary center of gravity can be set.

By training with such a dumbbell, muscles and connective tissue can be strengthened on the basis of repeated loading.

An object of the present invention is to provide a training tool which, during use, muscles are strengthened and connective tissue is subjected to extra mechanical loading during the effort of the muscle, more particularly the deeper connective tissue structures. To that end, according to the invention, the hollow space in the training tool is made of substantially elongate design.

By making the hollow space in the training tool of substantially elongate design, a tool has been obtained with which the user during acceleration and deceleration in the longitudinal direction thereof experiences a special effect. During acceleration and deceleration in the direction mentioned, a part of the amount of freely movable particles of solid material does not move relative to the holder, because these particles already rest against the end of the elongate hollow space that is oriented oppositely to the force exerted by the user. These particles, together with the holder, constitute 'dead mass', comparable to the weight of the granular material in the hollow space of the dumbbell, and for that reason directly exert a reaction force on the muscle tissue and the connective tissue envelope. The other part of the total amount of freely movable particles of solid material initially merely starts to shift in the elongate hollow space during acceleration and deceleration, which requires relatively little energy from the user. Thereupon, however, after a certain transit time, upon arrival of the particles at the respective end of the elongate hollow space, the particles are accelerated or decelerated still, so that all particles eventually move at the same speed as the holder. This leads to the above-mentioned special effect, viz. a delayed reaction force on the user, so that an extra mechanical load is exerted on muscles and connective tissue of the user, after the muscles have already been contracted. As a result, the muscles strengthen, and an adjustment in tensile strength and architecture of the connective tissue takes place.

The extra mechanical reaction force is exerted not only on the muscle tissue and the connective tissue envelope thereof, as is the case with the direct reaction force of the 'dead mass', but also on the capsule/ligament apparatus of the joints, the connective tissue in and around the nerve, the connective tissue in the vascular walls, the menisci and the vertebral disks, as well as on the bony structures of the postural and musculoskeletal system, and more particularly the deeper connective tissue structures. Due to the fact that the particles do not all arrive at the respective end of the hollow space at the same time, the reaction force is somewhat spread over time, so that the additional loading is not exerted at one single moment, as is the case with the 'dead mass', but is built up in the course of a certain length of time and then decreases gradually again, and is described as "reactive impact". The extra loading is thus more in the nature of a soft, resilient impulse than of a hard jolt with a short impact. What is thus achieved is that the tissue is not strained by the extra reaction force, thereby preventing the occurrence of injuries. The special effect of the extra loading arises both upon onset of the movement (the acceleration) and at the termination of the movement (the deceleration). By modifying the orientation of the elongate hollow space, the load on the connective tissue also varies.

Preferably, the holder comprises a tube, so that the training tool rests conveniently in the hand and has a simple geometry. Thus, a cost price advantage is obtained. The tube not only surrounds the hollow space, but also forms a handgrip for the user. However, the training tool can also be provided with an ergonomically shaped handgrip fitted around or on the tube. What is achieved by making the tube of cylindrical design is that the dynamics to which the amount of freely movable particles of solid material is subjected is one-dimensional and is not disturbed by structures deviating from the elongate pattern. By performing three-dimensional movements with the training tool, the user can train the connective tissue three-dimensionally in a focused manner.

The particles do not necessarily need to exhibit a predetermined structure, but may be of an irregular shape such as shard-shaped for instance, or granular or fragmentary, as is the case with slate chippings. The particles may also or alternatively be eccentric, e.g., having an eccentric center of gravity, as is also the case with slate chippings. By thus choosing an amount of freely movable particles of solid material having an irregular and/or eccentric shape, a training tool is obtained where the reaction force builds up and decreases even more gradually, i.e., when the reactive impact is more pronounced. When handling the training tool, the particles, due to their irregular (e.g., shard-shaped) shape, slide into each other when the movement is decelerated by the end caps. Upon sliding into each other, the particles, whilst rotating and tilting, end up in a position where the summed distance of the particles relative to the end caps is minimized. During this time period the particles transfer their kinetic energy at least not entirely to the holder, so that the reaction force is delayed. Moreover, at least a part of the kinetic energy is converted into heat. These two effects produce the reactive impact that counteracts the occurrence of a hard jolt with a short impact still further and reduce the chances of injuries being sustained. It is not required that all the particles have the irregular and/or eccentric shape, but that a sufficiently large percentage do provide a reactive impact. For example, if substantially all the particles are so configured, the reactive impact will result.

Preferably, the amount of freely movable particles of solid material make sound upon mutual collisions and/or upon collisions with the wall and/or an end face of the training tool, which is effected, for instance, by making the tube wall, the end face of the hollow space and/or the material of hard design, or by making the particles of solid material of non-hygroscopic design, so that the particles do not attract moisture. The sound gives the user, and possibly any bystanders, the sensation that a certain training intensity is being practiced. More particularly, the rhythmic handling of the training tool contributes to this aspect.

By coupling the training tool to another, similar training tool with the aid of a coupling piece, the user can adjust the weight that causes the reaction forces, more particularly set it to meet a specific need regarding his or her connective tissue to be stimulated.

By fastening the training tool to a limb, such as an arm, hand, leg or foot, optionally with the aid of an accessory, it is no longer necessary to grip the tool with the hand. In this way, the user can also stimulate the connective tissue of the lower limbs.

The invention further relates to a coupling piece.

The invention also relates to a method for handling a training tool.

Further advantageous embodiments of the invention are set forth in the dependent claims.

BRIEF DESCRIPTION OF THE DRAWINGS

The invention will be elucidated in more detail on the basis of exemplary embodiments which are represented in the drawing. In the drawing.

DETAILED DESCRIPTION OF THE INVENTION

Figure 1:
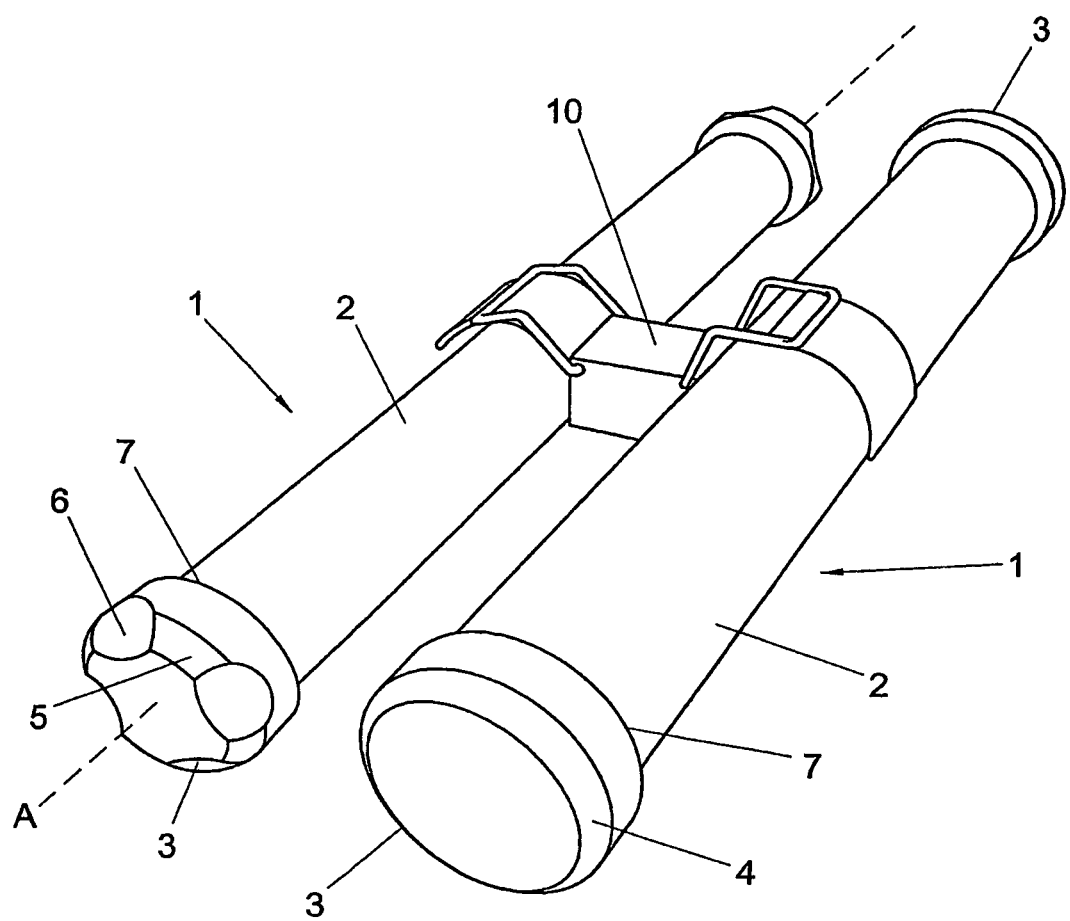
FIG. 1 is a schematic view of two mutually coupled training tools according to the invention.

The figures are only schematic representations of preferred embodiments of the invention. In the figures, the same or corresponding parts are indicated with the same reference numerals.

In FIG. 1, a training tool 1 is represented which has been coupled to another, similar training tool 1 with the aid of a coupling piece 10. The training tool 1 comprises an elongate hollow tube 2 with end faces which are designed as end caps 3. The end caps 3 can have different external profiles, such as, for instance, the rotation-symmetrical profiles 4 or the ergonomically shaped profiles 5 with cut-out segments 6, as represented in FIG. 1. Further, the end caps 3 are preferably provided with a flanged edge 7 which extends substantially transversely to the longitudinal axis A of the hollow tube 2. The flanged edge 7 constitutes a stop, so that a user of the training tool 1, when handling the tool 1 with the hand and threatening to lose grip of the tube 2, will not let the tool 1 slip directly from his or her hand, but restore grip upon the flanged edge 7 abutting against the inside of the palm of the hand.

The elongate tube 2 encloses a hollow space (not shown) which is partly filled with an amount (not shown either) of freely movable particles of solid matter. By accelerating or decelerating the training tool 1 in the longitudinal axis A of the tube 2, the particles of solid matter also accelerate or decelerate. However, one part of the particles reacts directly with a reaction force, whereas another part reacts only after some transit time, since these particles do not yet abut against an end cap 3 and hence first move through a part of the hollow space, so that a deceleration is realized. The instantaneously reacting particles instantaneously exert a reaction force on the user, while the other part of the particles exert a delayed reaction force, that is, after the transit time. The combination of reaction forces with an instantaneous and a delayed effect, respectively, results in a better mechanical loading of the connective tissue than in the case of a loading that is exerted instantaneously alone. The extra loading is moreover exerted on deeper connective tissue structures, so that these tissues are mechanically loaded as well.

The connective tissue is loaded in the direction that is parallel to the longitudinal axis A of the tube 2 in which the particles are accelerated and decelerated, but also in other directions, since the structures are oriented three-dimensionally. By changing the orientation of the training tool 1 and the direction of deceleration and acceleration, the user can load his or her connective tissue structure in a focused manner, so that an optimum training effect is obtained.

To obtain the delayed effect, the cavity in the tube 2 is made of elongate design. To ensure good handling properties of the training tool, the length of the hollow tube 2 has been limited, for instance to between about 10 cm and about 75 cm, with a range of about 30-75 cm being preferred, and a range of between about 50-70 cm being more preferred. To facilitate gripping by the hands of a user, the tube 2 may have a diameter between about 10 mm and about 150 mm, preferably between about 40-80 mm, and more preferably between about 50-70 mm.

The hollow tube 2 is only partly filled with the amount of freely movable particles of solid material, so that the particles have the possibility of shifting and hence accomplishing the delayed effect. With a view to this, the hollow space volume is filled, for instance, for about 25% to about 83% with the above-mentioned particles. A range of between about 45%-85% is more preferred, with a range of between about 50%-80% being most preferred.

If the particles are too large, this results in a succession of small discrete force pulses, which is less desirable. For that reason, it is important, as regards the dimensions of the particles of solid material, that the particles are not too large. For instance, a longest dimension ranging between about 0.5 mm and 25 mm is believed to provide desirable results, and with a longest dimension between about 0.75 mm-15.0 mm believed to be more desirable. Particle sizes in these ranges provide that the delayed effect of the reaction force that the particles exert on the user increases and decreases gradually as the particles collide during acceleration and deceleration, yielding a more or less natural course. This desired property is sometimes referred to herein as "reactive impact". It should be understood that the invention requires that enough particles fall within the size range to provide a reactive impact. For example, when substantially all the mass of particles fall within those ranges, the presence of a relatively small amount of particles on either side of the ranges will not significantly degrade performance. Accordingly, the delayed reaction force is more in the nature of a soft, resilient impulse than a sudden, hard jerk. This last is the case, for instance, with a hollow space enclosed by the holder, which is filled with an amount of liquid or with relatively large masses, such as a ball. Preferably, the particles have, for instance, dimensions of about 2 mm×about 1 mm×about 0.3 mm. The particles do not necessarily need to have a predetermined structure, but are, for instance, granular or shard-shaped, as in the case of slate chippings. Granular or shard-shaped particles are also believed to cause or contribute to a reactive impact. It is not necessary that each particle be so shaped, but only that a sufficient amount of particles are so shaped to provide the desired reactive impact. For example, if substantially all the particles are so shaped, the reactive impact will result. The particles may also or alternatively be eccentric, i.e., have an eccentric center of gravity, as is also the case with slate chippings. An eccentric center of gravity is also believed to cause or contribute to a reactive impact. The density of the particles is connected with the desired total weight of the training tool, which is, for instance, between about 0.25 kg and about 5 kg, preferably in a design of about 0.75 kg and a design of about 1.5 kg, so that the tool allows of convenient handling, also by untrained or less trained persons. Naturally, it is possible to manufacture a set of training tools offering a more refined range as regards the total weight of the individual tools. The particles used in the elongate cavity have a density of, for instance, about $0.7 \times 10^3$ kg/m$^3$ to about $15 \times 10^3$ kg/m$^3$, preferably between about $2.7 \times 10^3$ kg/m$^3$ and about $8 \times 10^3$ kg/m$^3$. The particles of solid material are homogeneous, or the particles form a mixture. Furthermore, the size of the particles can differ per particle, as is the case, for instance, with slate chippings. It is also possible, however, to provide the tube 2 with particles having a uniform size distribution.

Figure 9:
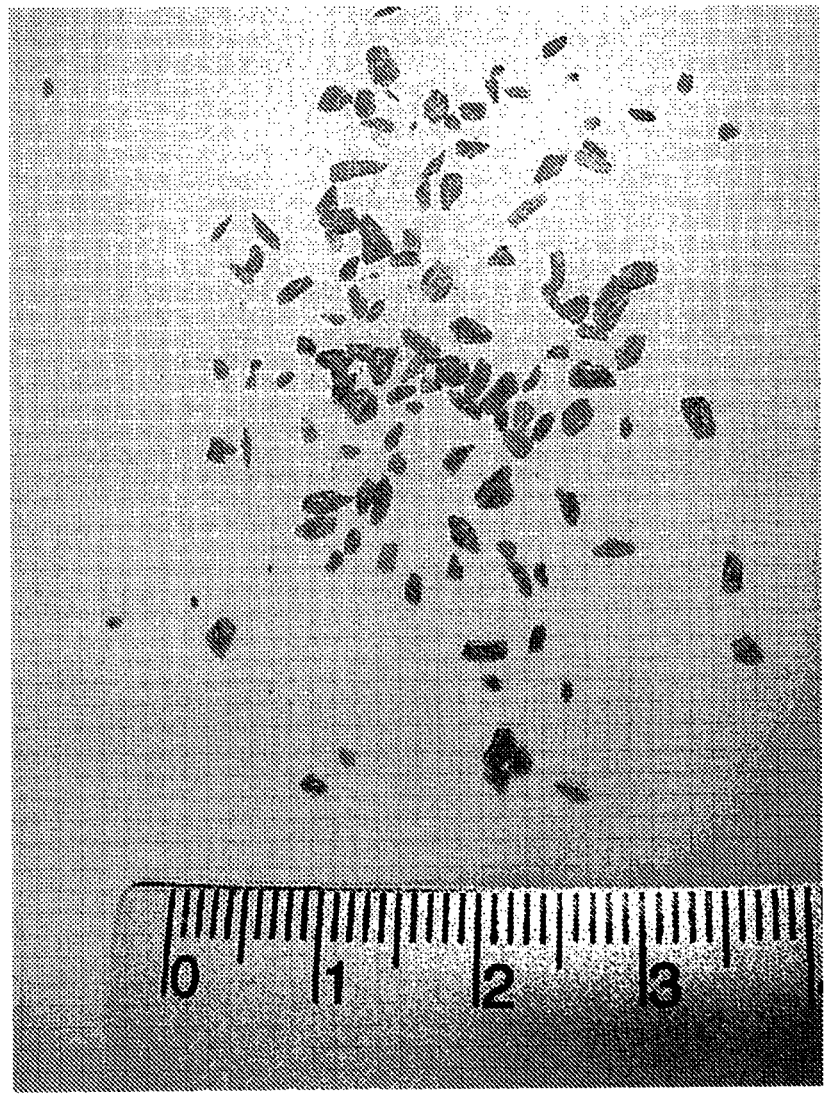
FIG. 9 is a photograph providing perspective view of a collection of particles configured to provide a reactive impact.
Figure 10:
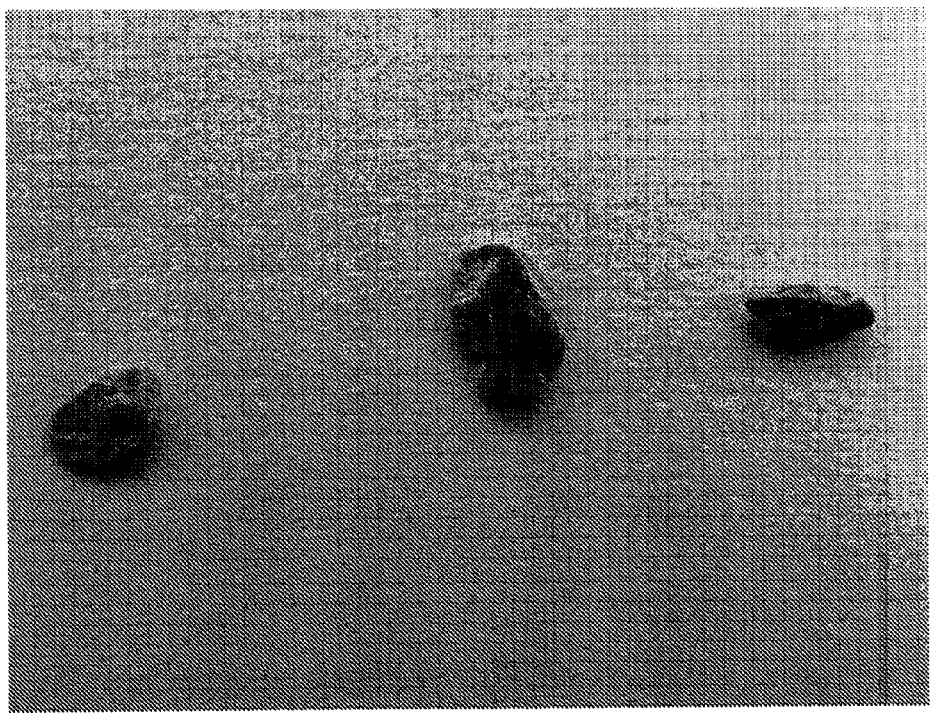
FIG. 10 is a photograph providing a perspective view of three particles configured to provide reactive impact.

FIGS. 9 and 10 depict particles configured to provide a reactive impact. These figures illustrate the irregular configuration of the particles. In addition, the particles are shard shaped and have an eccentric center of gravity. The photos also depict chips or small fragments of the particles that are outside the preferred range of particle sizes. Those chips or small fragments are typically an inevitable result of use of the device and do not significantly affect its performance as described herein. Thus, the photo illustrates that not every particle must fall within the desired range of sizes, but a relatively small number may be outside the size range. For example, if substantially all the particles are within the size range, the desired reactive impact can result. The particles of FIGS. 9 and 10 are slate chips.

By providing a relatively light tube 2 with a relatively large amount of freely movable particles of solid material, configured to provide a reactive impact, the proportion of the delayed reaction force is significant with respect to the instantaneous reaction force caused by the dead mass. This is preferred since the instantaneous force has a less strong training effect on the connective tissue. The dead mass comprises the weight of the hollow tube 2 in which the freely movable particles are included, and the end caps 3. The ratio between the freely movable particles and the dead mass is in a range of between about 1 and about 30, with narrower ranges of between about 1.2-4.0, and more particularly between about 1.25-3.5 being preferred.

What is achieved by closing off the hollow space in the tube 2 hermetically, that is, airtightly, is that the reactive impact is not reduced by air flowing into and out of the hollow tube 2, which can impart additional thrust to the particles. This also prevents the possibility of air with dust particles flowing out of the training tool during handling of the hollow tube 2, thereby avoiding contamination of both the user of the training tool and the atmosphere in the proximity of the user. Advantageously, an airtight hollow space can be obtained relatively easily and inexpensively by bonding the end caps 3 to the hollow tube 2 with a strong and durable glued joint. If in addition the tube 2 is sealed watertightly, this prevents the particles absorbing moisture and thereby exhibiting physically different behavior, for instance in that they stick together, thereby drastically increasing the effective diameter of the particles.

The freely movable particles of solid material make sound upon mutual collisions, collisions with the wall and/or an end face of the training tool. This effect can be enhanced by including non-hygroscopic particles in the tube 2, which, moreover, just like the wall and the end caps 3, are hard. The effect may also be enhanced by providing particles configured to provide a reactive impact. This is the case, for instance, with slate chippings, but also other materials are possible, such as, for instance, various kinds of granulate, grit or sand. The material from which the wall of the tube 2 and the end caps 3 are made comprises, for instance, a metal, such as aluminum, or a hard and wear-resistant plastic. By the use of a hollow tube 2 with a metal wall, an ergonomically even more attractive training tool is obtained, which advantageously counteracts sweating of the hand that grips the tube, since the metal dissipates the body heat. As a consequence, the provision of a grip profile is not requisite for a good grip of the tube. Preferably, the aluminum is anodized in order to prevent corrosion and the like. In view of the intensive interaction of the particles with the end caps, the use of a hard and light plastic for the end caps is preferred. Thus, a preferred embodiment comprises, for instance, an aluminum tube and plastic end caps.

Figure 2:
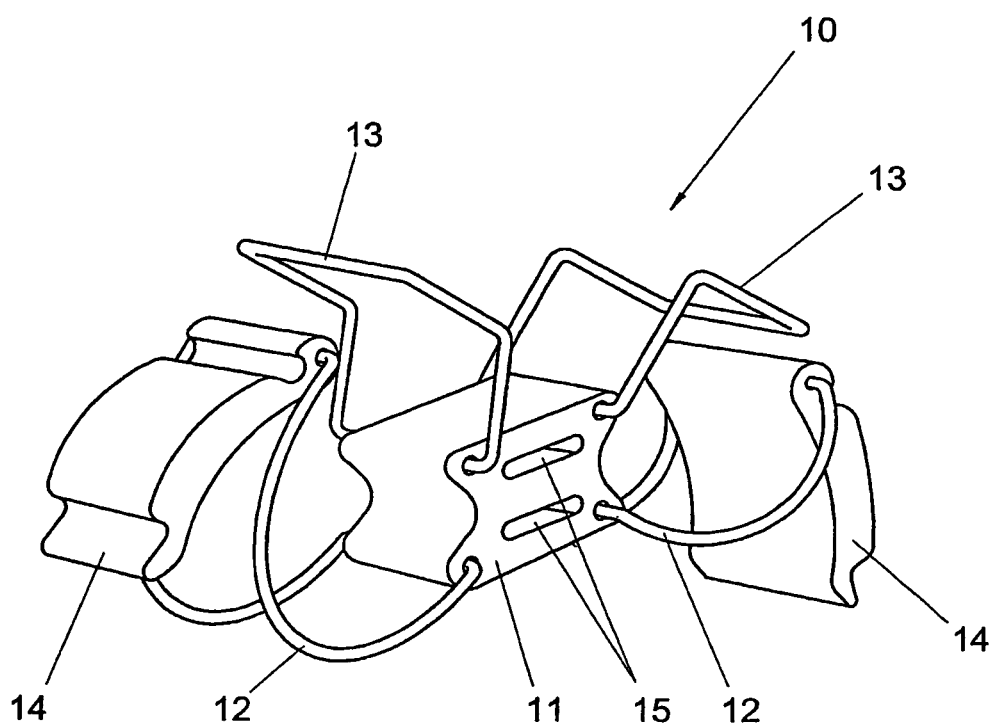
FIG. 2 is a schematic view of a coupling piece according to the invention.
Figure 3:
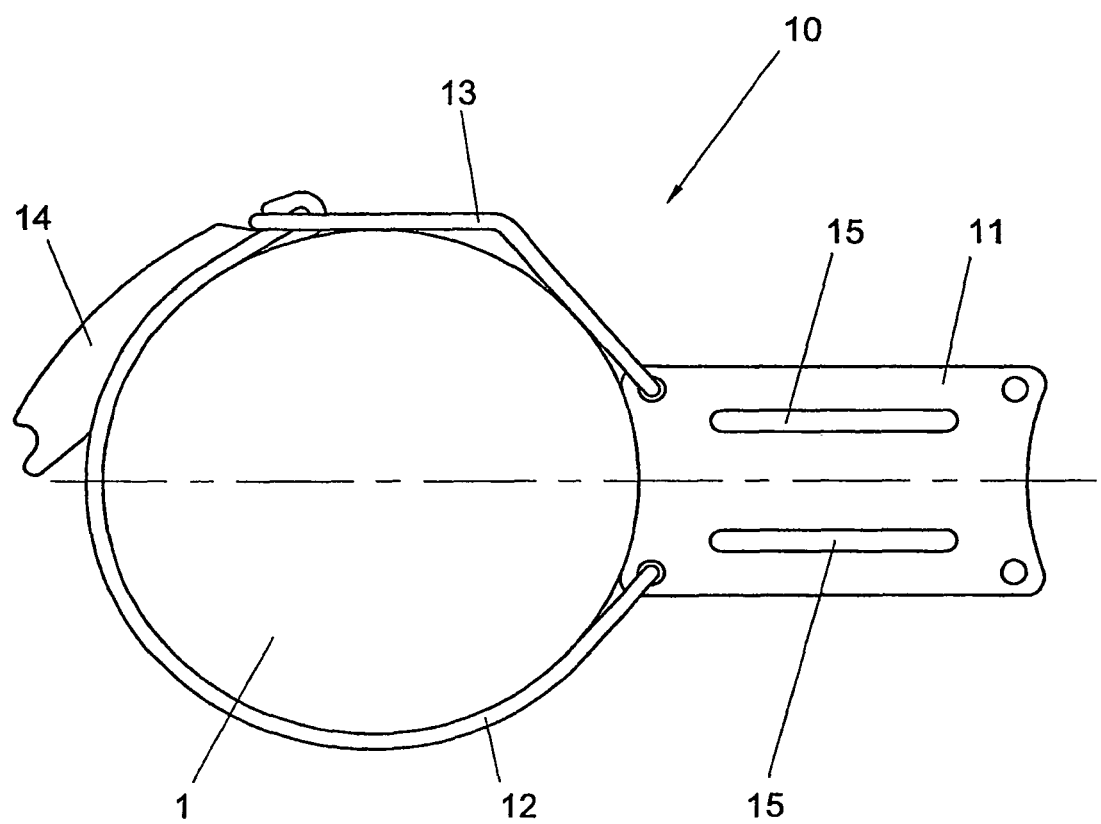
FIG. 3 is a schematic view of the coupling piece of FIG. 2 with a clamped training tool of FIG. 1.

In FIG. 1 the training tool 1 has been coupled with the aid of a coupling piece 10 to another, similar training tool 1 having a different diameter, with the longitudinal axes of the tubes 2 more or less coinciding. As a result, the training effect on the connective tissue is enhanced. The coupling piece is also represented in FIGS. 2 and 3, where a more or less block-shaped coupling block 11, for instance of a metal, such as aluminum, or manufactured from a plastic, is provided with a mechanism for coupling to two training tools 1. To that end, the coupling block 11 has two lower springs 12 and two tension springs 13 which are hingedly included in the coupling block 11. Further, the lower springs 12 are fitted with closing pieces 14, for instance clips, so that the assembly of coupling block 11, lower spring 12, closing piece 14 and tension spring 13 embraces a training tool 1 with a rapid coupling. However, other rapid couplings are also possible, for instance with the aid of tensioning straps.

Further, the coupling block 11 is provided with connecting means, such as, for instance, slots 15, through which fastening means, such as for instance a fastening belt, can be slipped, so that the training tool can be fastened to limbs with the coupling piece 10 as an accessory. Thus, a user can also mechanically load the connective tissue in the lower limbs.

Figure 4:
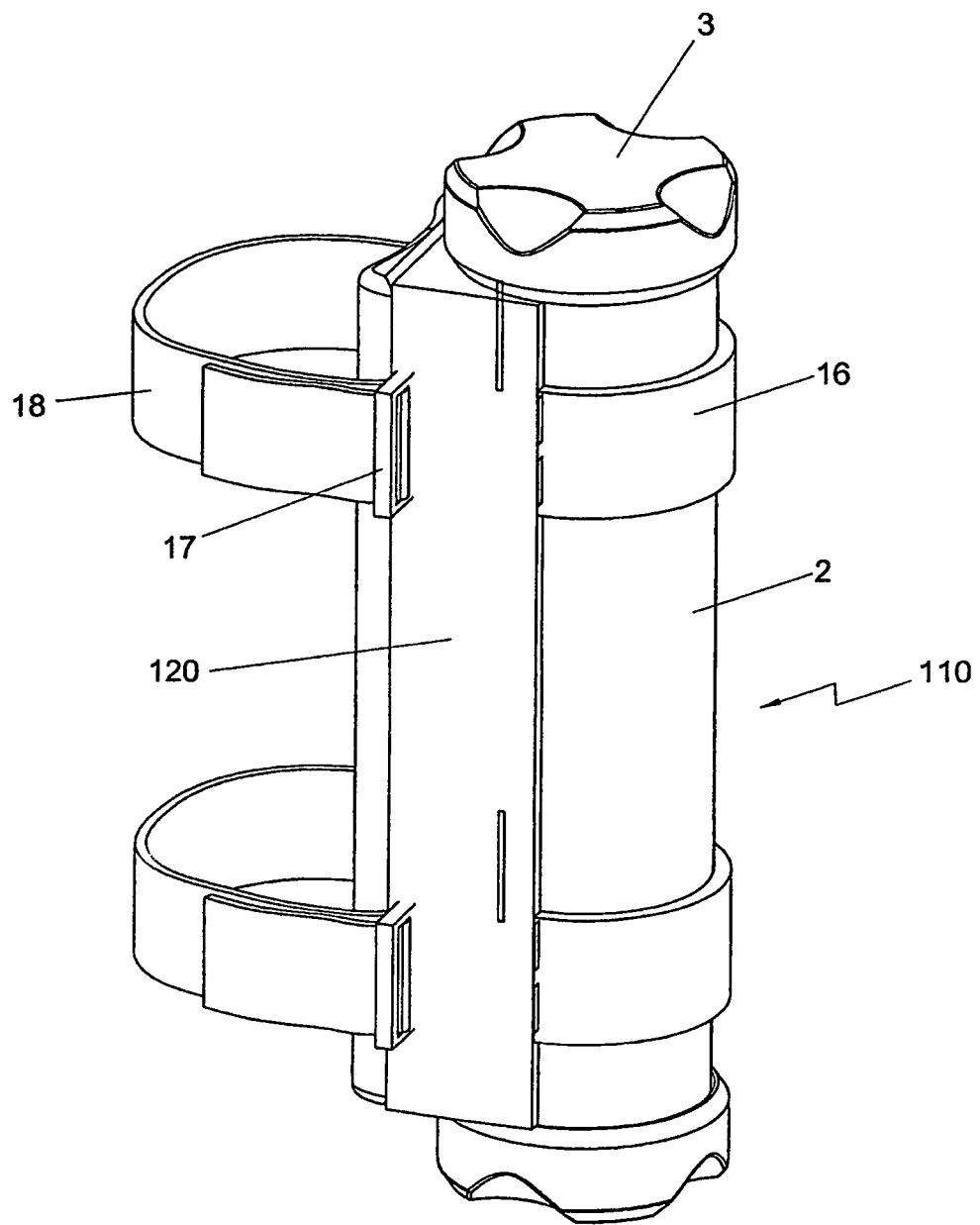
FIG. 4 is a schematic view of a connecting piece according to the invention.

FIG. 4 shows a first embodiment of a connecting piece 110, which is also suitable to be attached to limbs, such as a forearm or a lower leg. The hollow tube 2 with end caps 3 has been fastened, with the aid of a rapid coupling 16 or a different coupling element, to a connecting block 120. The connecting block 120 is provided with fastening elements for coupling the connecting block 120 to a limb. The fastening elements can be designed as projections 17 with slots, through which connecting belts 18 can reach which can embrace the limb, so that the connecting piece 110 is substantially rigidly attached to the limb. Naturally, it is also possible to design the fastening elements differently, for instance with a rapid coupling.

Figure 5:
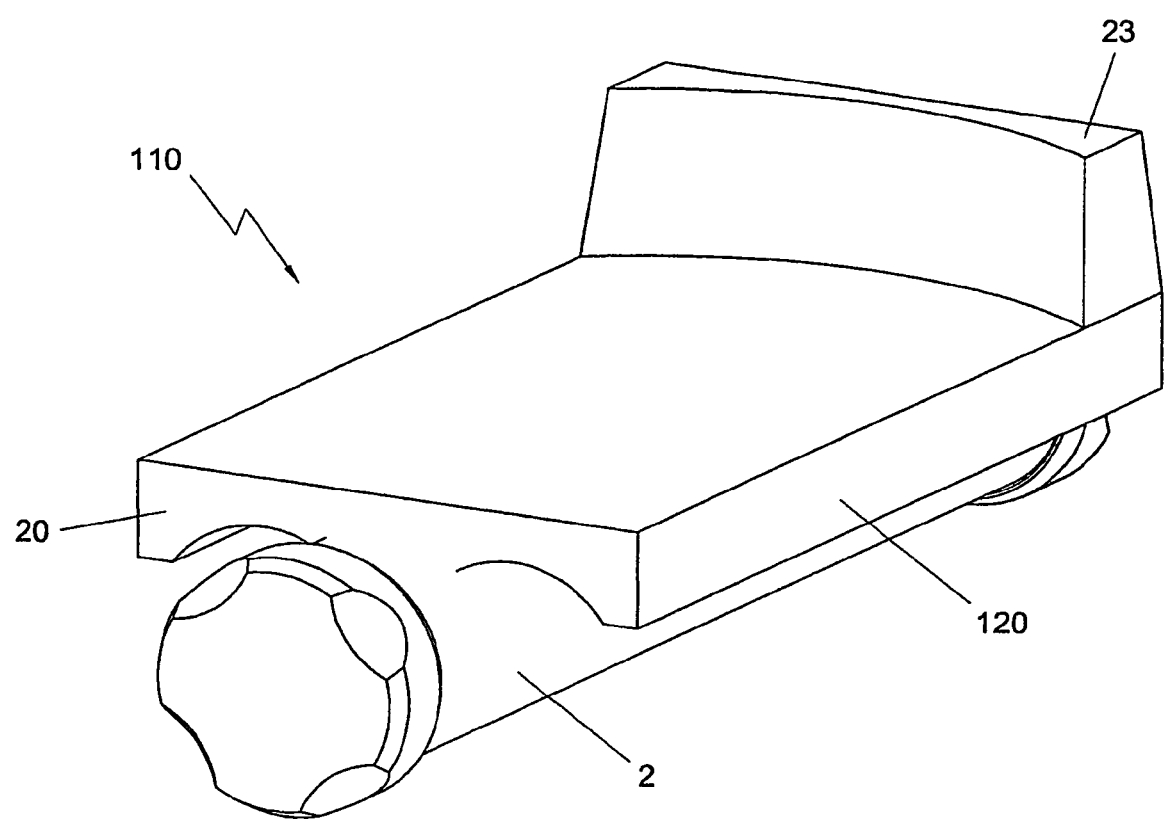
FIG. 5 is a schematic view of another connecting piece according to the invention.

Further, FIG. 5 shows a second embodiment of a connecting piece 110, which is specifically suitable for attachment to a foot. The connecting piece 110 comprises a connecting block 120 to which the hollow tube 2 can be attached in the manner described above. The connecting block 120 has a sole plate 20 on which the sole of the foot or of footwear can be supported or abut. Also, the connecting block 120 has a rear face 23, which is oriented substantially transversely with respect to the sole plate 20, for support or abutment of the heel of the foot 19 or the back of the footwear. Optionally, the rear face 23 is adapted to be swung clear. The foot can be attached to the connecting block 120 with the aid of fastening belts or other fastening means not represented in FIG. 5, for instance with the aid of a rapid coupling as shown in FIG. 4. By providing a plurality of engagement points for the fastening means on the connecting block 120, the connecting piece 110 is suitable for feet of different sizes.

Figure 6:
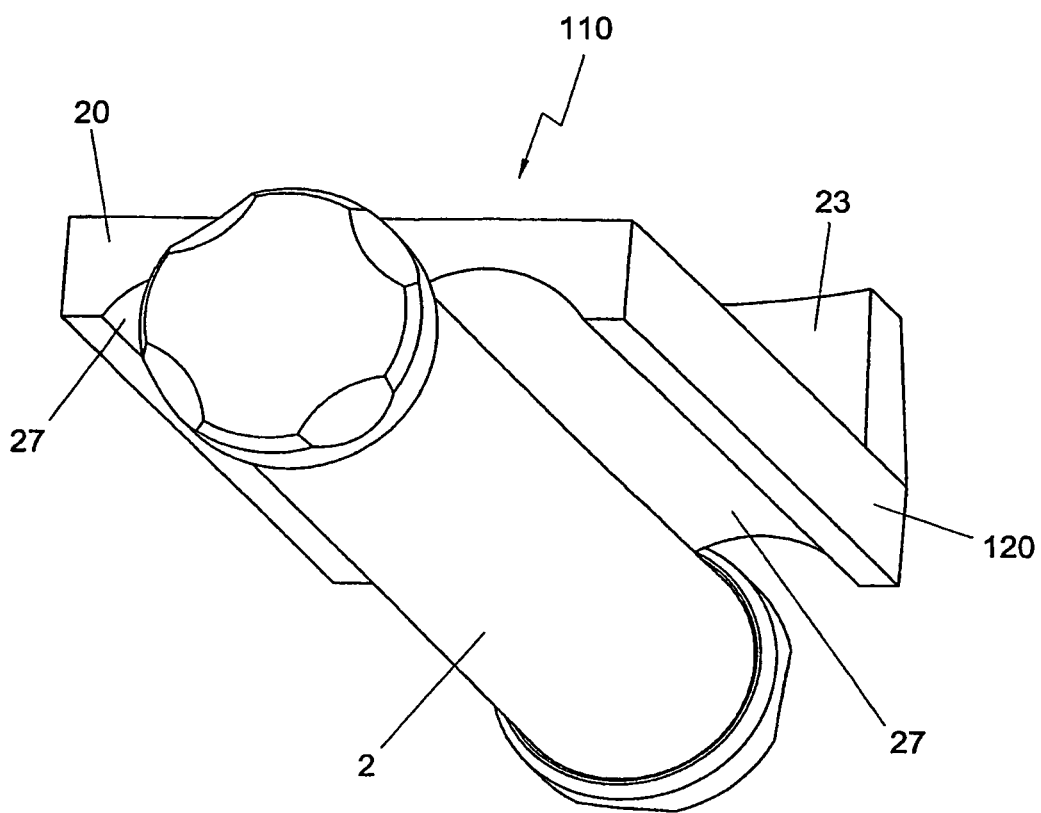
FIG. 6 is a schematic view of a coupling block of the connecting piece from FIG. 5.

In FIG. 6 the connecting block 120 with the sole plate 20 and the rear face 23 is represented in a perspective bottom view. Optionally, the rear face 23 can extend not only above the sole plate 20 but also under it, so that the hollow tube 2 can also find support against it. Furthermore, in the underside of the sole plate 20, a cavity 27 is provided, in which the hollow tube 2 can rest, so that lateral shifting is prevented. By providing a plurality of cavities 27, a plurality and/or different types of hollow tubes 2 can be fastened to the sole plate 20, thereby enabling training with different masses. As shown in FIG. 6, the longitudinal axis of the hollow tube 2 is substantially parallel to the longitudinal axis of the foot. Naturally, other orientations are also possible, for instance substantially transverse to the longitudinal axis of the foot.

It is noted that the connecting piece 110 is not limited to application to a hollow tube 2 which is filled with particles configured to provide a reactive impact, such as slate chippings. Thus, the invention more generally relates inter alia to a training tool which has a connecting piece for coupling a limb to a second training tool, the connecting piece comprising a connecting block which is provided with fastening elements for fastening to a limb and with coupling elements for coupling to the second training tool comprising a hollow space enclosed by a holder, which space is partly filled with an amount of freely movable particles of solid material, the hollow space being made of substantially elongate design.

Figure 7:
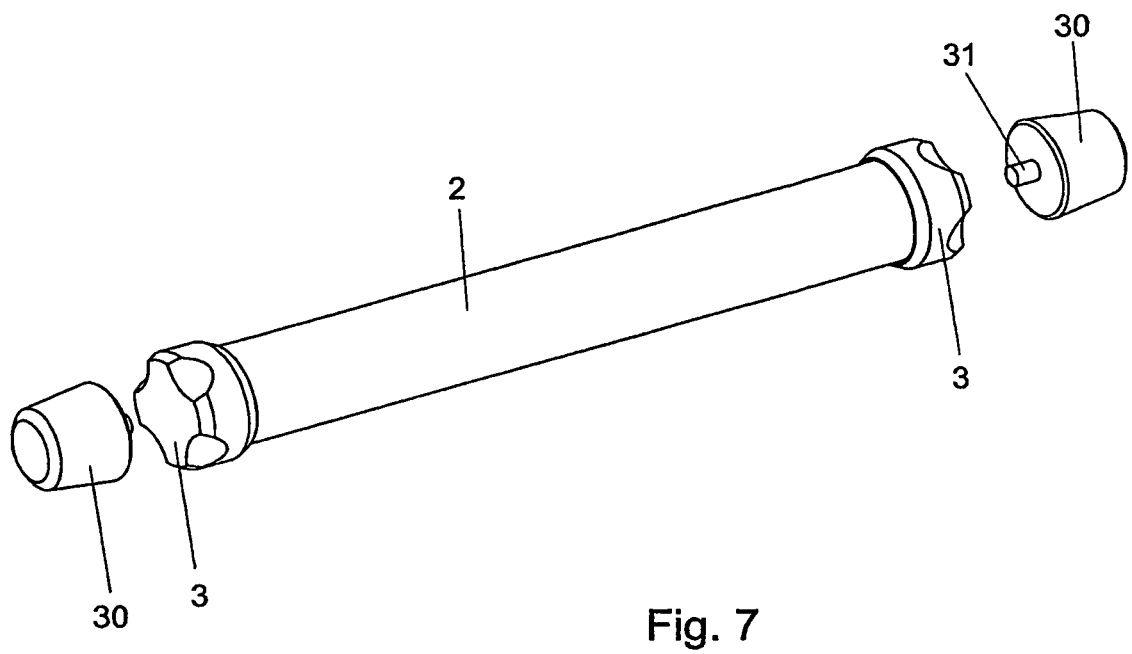
FIG. 7 is a schematic view of a training tool of FIG. 1, with the end caps provided with additional weights.
Figure 8:
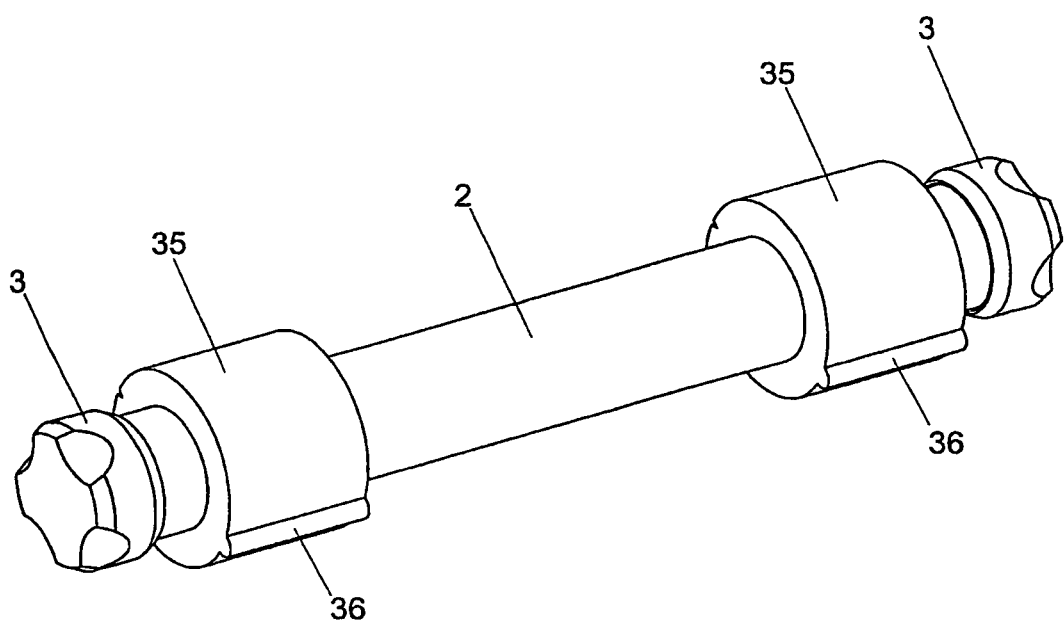
FIG. 8 is a schematic view of a training tool of FIG. 1 with additional ring-shaped weights.

To enlarge the mass of training tools, the end caps 3 may be provided with extra weights 30, as shown in FIG. 7. The extra weights 30 are detachably coupled to the end caps 3 with a mortise and tenon joint 31. Naturally, other connecting elements are possible, such as a screwed connection. The extra weights can also be made of ring-shaped design and surround the hollow tube 2 like a sleeve, as shown in FIG. 8. The ring-shaped weights 35 can be fitted around the hollow tube 2, for instance, as a substantially rigid whole with a hinge mechanism 36. A more flexible design is also possible, for instance a flexible body capable of embracing the hollow tube 2 with a fastening element, such as a snap system. The extra weights 30, 35 enable more intensive training of muscles and connective tissue.

Test-Model and Graphics.

Figure 11:
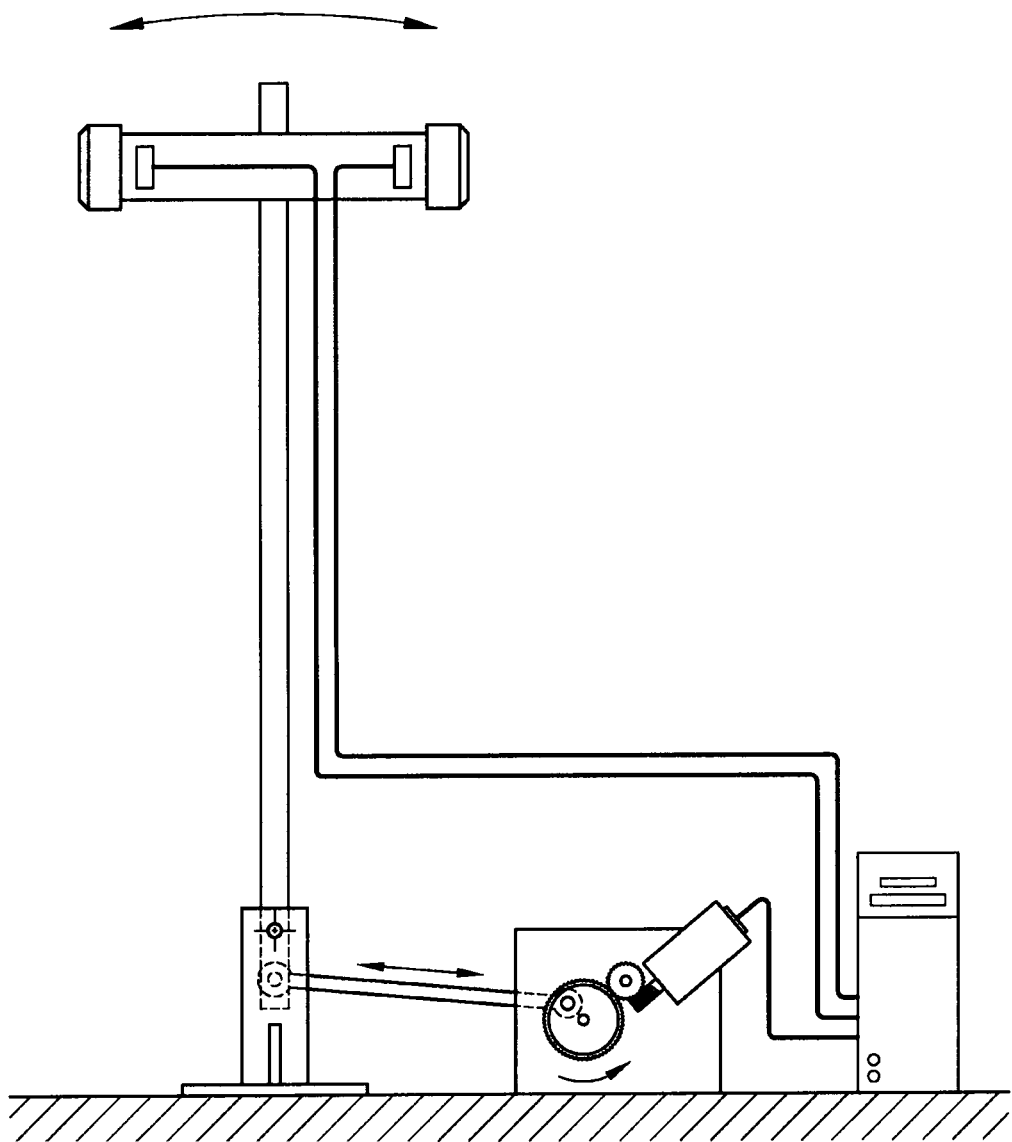
FIG. 11 is a photograph of a mechanical test apparatus used to collect performance data.

In a test-model a mechanic arm with a number of sensors has been outfitted with a standard embodiment of the invention, referred to herein as a Tube Trainer, an identical container but with a mass that consists of marbles and an identical container with a dead mass. The mechanical test apparatus is depicted in FIG. 11. In all 3 configurations the mass had exactly the same weight. The mechanic arm moves backward and forward and the sensors measure the energy and transmit this to a computer for analysis. The test were performed by the University of The Hague, department of Human Kinetics.

Figure 12:
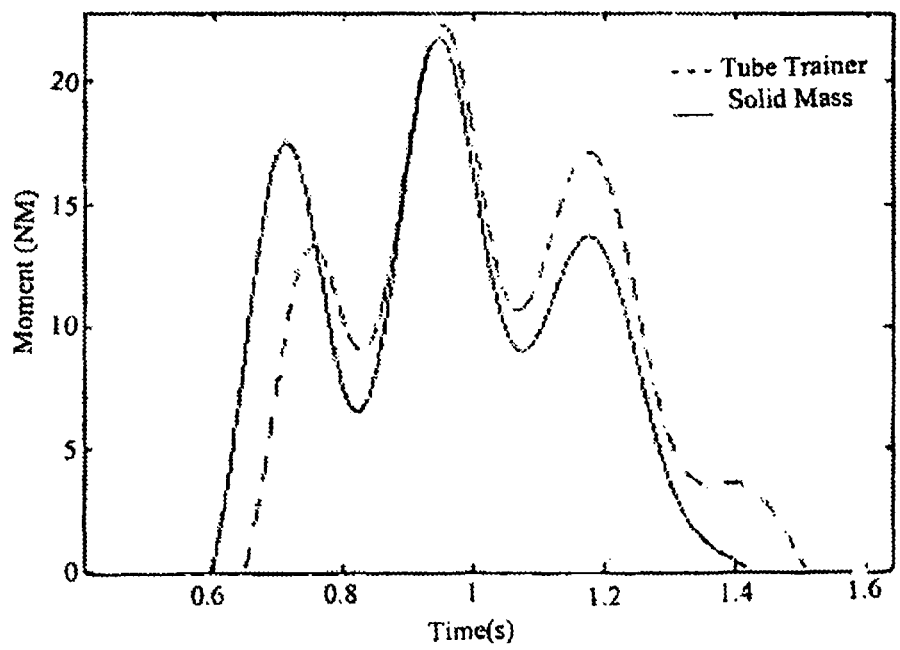
FIG. 12 is a graph of moment (NM) as a function of time (S) comparing the Tube Trainer with an identical container filled with a solid mass.
Figure 13:
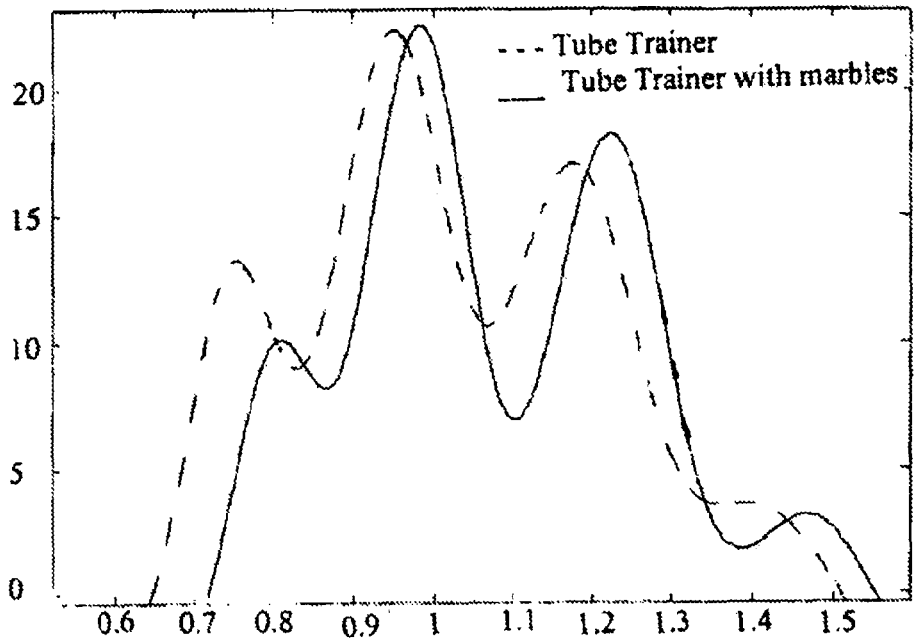
FIG. 13 is a graph of moment (NM) as a function of time (S) comparing the Tube Trainer with an identical container filled with marbles.

FIGS. 12 and 13 are graphs of moment (NM) as a function of time (S) comparing in FIG. 12 the Tube Trainer and the identical container filled with a solid mass and in FIG. 13 the Tube Trainer and the identical container with marbles, run on the mechanical test apparatus of FIG. 11. In all graphics there are 3 peaks. The first peak (at left) relates to the moment when to movement slows down in order to change direction. The second peak (middle) is exactly at the change of direction and the third peak (at right) is at the moment of acceleration into the other direction. The wider the peak the longer the period in which the energy is absorbed. Ideally the first peak should have a relatively low energy. The middle of the middle peak should be similar because all the weight is the same and the third peak should have the soft overload of energy that is ideal for training physical performance.

Referring to FIG. 12, with the solid mass there is actually a relatively high energy in the 'slow down' peak at left and a relatively low energy at the 'acceleration' peak at right. The Tube Trainer creates exactly the opposite effect of the dead mass. Here we see that in the 'acceleration peak' the energy is approx. 25% higher for Tube Trainer.

Referring to FIG. 13, marbles are also a loose mass but completely round. This means that marbles will find their maximum density very fast and will transfer their kinetic energy easily to the next marble just as a billiard ball would do. However, in the test model as used, this could not be measured because the speed of the mechanic arm could not be increased enough in order to let the marbles move in a similar way as the Tube Trainer with the irregular shaped granulate. That is why the timing of the effect of the marbles is completely out of line with the timing of the normal physical movement and thus no positive effect can be expected. A similar container with marbles as the freely moving material can only be used at intense speed of movement and in such case would not create a soft impact at the right moment of overload.

The invention is not limited to the exemplary embodiments described here. Many variants are possible.

Thus, the diameter, but also the length of the tube 2 can be indicative of the total weight of the training tool 1. However, the weight can also be indicated by the use of colors on the tube 2 or the end caps 3.

Such variants will be clear to those skilled in the art and are understood to fall within the scope of the invention, as set forth in the following claims.

What is claimed is:

1. A training tool comprising a substantially elongate tubular hollow space enclosed by a tubular holder, the elongate hollow space being at least partly filled with an amount of freely movable particles, substantially all of the particles being configured to provide during use a delayed, reactive impact force after a change of direction of a training tool movement occurs when the particles collide during acceleration, wherein the amount of freely movable particles substantially comprises irregular shaped particles capable of shifting to enhance the delayed impact effect, each irregular shaped particle having an eccentric center of gravity and an elongated shape, wherein the elongated shape is substantially longer along a first axis relative to a second axis perpendicular to the first axis.

2. A training tool according to claim 1, wherein the amount of freely movable particles comprises particles having a first axis length between about 1 mm and about 15 mm.

3. A training tool according to claim 1, wherein a space volume is filled from about 45% to about 86% with the amount of freely movable particles.

4. The training tool according to claim 1 wherein the delayed, reactive impact force of the eccentric particles behaves in a non-fluidic manner.

5. The training tool according to claim 1 wherein the first axis is at least about twice as long as the second axis.

6. The training tool according to claim 1 wherein the first axis is at least about six times as long as the second axis.

7. The training tool according to claim 1 wherein the first axis is about 2 mm and the second axis is about 1 mm.

8. The training tool according to claim 1 wherein the first axis is about 2 mm and the second axis is about 0.3 mm.

9. The training tool according to claim 1 wherein the first axis is in the range between about twice as long as the second axis and about six times as long as the second axis.

10. A training tool according to claim 1, wherein the particles have a mass density ranging from about $2.7 \times 10^3$ kg/m$^3$ to about $8 \times 10^3$ kg/m$^3$.

11. The training tool according to claim 1, wherein the delayed reaction is significant with respect to an instantaneous reaction force caused by a dead mass of the holder.

12. A training tool comprising a substantially elongate tubular hollow space enclosed by a tubular holder, the elongate tubular hollow space being at least partly filled with an amount of freely movable particles, substantially all of the particles being configured to provide during use a delayed, reactive impact force after a change of direction of a training tool movement occurs when the particles collide during acceleration, wherein the amount of freely movable particles substantially comprises irregular, shard-shaped particles wherein each shard-shaped particle having an elongated shape, wherein the elongated shape is substantially longer along a first axis relative to a second axis perpendicular to the first axis.

13. A training tool comprising a substantially elongate tubular hollow space enclosed by a tubular holder, the elongate hollow space being at least partly filled with an amount of freely movable particles, substantially all of the particles being configured to provide during use a delayed, reactive impact force after a change of direction of a training tool movement occurs when the particles collide during acceleration, wherein the amount of freely movable particles comprises irregular shaped particles having different sizes and capable of shifting to enhance the delayed impact effect, and wherein the amount of freely movable particles substantially comprises particles each having an elongated shape, wherein the elongated shape is substantially longer along a first axis relative to a second axis perpendicular to the first axis.

14. A training tool comprising a substantially elongate tubular hollow space enclosed by a tubular holder, the elongate hollow space being at least partly filled with an amount of freely movable particles, substantially all of the particles being configured to provide during use a delayed, reactive impact force after a change of direction of a training tool movement occurs when the particles collide during acceleration, wherein the freely movable particles include particles capable of shifting to enhance the delayed impact effect, and wherein the amount of freely movable particles substantially comprises irregular shaped particles each having an elongated shape, wherein the elongated shape is substantially longer along a first axis relative to a second axis perpendicular to the first axis.

15. A training tool comprising a substantially elongate tubular hollow space enclosed by a tubular holder, the elongate hollow space being at least partly filled with an amount of freely movable particles, substantially all of the particles being configured to provide during use a delayed, reactive impact force after a change of direction of a training tool movement occurs when the particles collide during acceleration, wherein a diameter of the training tool is between about 40 mm and about 80 mm, wherein a amount of freely movable particles comprises material having an eccentric center of gravity, and wherein the amount of freely movable particles substantially comprises irregular shaped particles capable of shifting to enhance the delayed impact effect, each particle having an elongated shape, wherein the elongated shape is substantially longer along a first axis relative to a second axis perpendicular to the first axis.

16. A training tool comprising a substantially elongate tubular hollow space enclosed by a tubular holder, the elongate hollow space being at least partly filled with an amount of freely movable particles, substantially all of the particles being configured to provide during use a delayed, reactive impact force after a change of direction of a training tool movement occurs when the particles collide during acceleration, wherein the holder comprises an elongate hollow tube with end faces which are designed as end caps and wherein the amount of freely movable particles substantially comprises irregular shaped particles capable of shifting to enhance the delayed impact effect, each particle each having an elongated shape, wherein the elongated shape is substantially longer along a first axis relative to a second axis perpendicular to the first axis.

17. A training tool according to claim 16, wherein the end caps are free of a gripping profile.

18. A training tool according to claim 16 or 17, wherein the end caps are provided with a flanged portion extending substantially transversely to a longitudinal axis A of the hollow tube for forming a stop.

19. A method for training muscles and connective tissue structures of a user, the method comprising:
  providing a substantially elongate tubular hollow space enclosed by a tubular holder, the hollow space being at least partly filled with an amount of freely movable particles substantially comprising irregular shaped particles capable of shifting to enhance the delayed impact effect, each irregular shaped particle having an elongated shape, wherein the elongated shape is substantially longer along a first axis relative to a second axis perpendicular to the first axis;
  operatively associating the holder with muscles and connective tissue structures of a user;
  accelerating and decelerating the freely movable particles along a lengthwise axis of the elongate hollow space by user actuation of the muscles and connective tissue structures; and
  controlling a reactive impact force applied by the particles to the connective tissue by applying part of the reactive impact force directly upon user actuation and part of the reactive force upon a delay, wherein the controlling the reactive impact force is accomplished by the freely moving particles including irregular shaped particles having the capability of shifting to enhance the delayed impact effect.

* * * * *

UNITED STATES PATENT AND TRADEMARK OFFICE
CERTIFICATE OF CORRECTION

PATENT NO. : 8,932,189 B2  
APPLICATION NO. : 11/262457  
DATED : January 13, 2015  
INVENTOR(S) : Johannes Theodorus Hermans It is certified that error appears in the above-identified patent and that said Letters Patent is hereby corrected as shown below:

Title Page item (63) should read  
Related U.S. Application Data  
Continuation-in-part of application No.  
PCT/NL2004/000279, filed on Apr. 28, 2004.

In the Specification  
Column 1, Lines 5-13 should read  
RELATED APPLICATIONS  
    This application is a continuation in part of International Application Number PCT/NL2004/000279, filed April 28, 2004 (WO 2004/096377, published November 11, 2004) entitled "Training Tool, Coupling Piece and Method for Handling a Training Tool," which claims priority to Netherlands Application No. 1023281, filed April 28, 2003, both of which are hereby incorporated by reference.

Signed and Sealed this  
Twenty-third Day of June, 2015

Michelle K. Lee  
*Director of the United States Patent and Trademark Office*